Patented Dec. 15, 1925.

1,566,247

UNITED STATES PATENT OFFICE.

JAMES M. GILLET, OF MILWAUKEE, WISCONSIN, ASSIGNOR TO THE GOODYEAR TIRE AND RUBBER COMPANY, OF AKRON, OHIO, A CORPORATION OF OHIO.

PROCESS OF VULCANIZATION OF CAOUTCHOUC.

No Drawing.   Application filed July 31, 1922.   Serial No. 578,787.

*To all whom it may concern:*

Be it known that I, JAMES M. GILLET, a citizen of the United States, and resident of Milwaukee, Wisconsin, have invented new and useful Improvements in Processes of Vulcanization of Caoutchouc, of which the following is a specification.

My invention relates to the method of making a rubberized fiber composition which may be utilized in a variety of capacities, such as for floor or wall coverings, as a substitute for leather, or for any purpose to which a tough, flexible, porous, water-resistant body may be adapted. My invention likewise relates to an improved method of effecting the vulcanization of rubber and rubber compounds at ordinary temperatures.

One object of my invention is to provide a method of vulcanizing rubber without the aid of heat, which reduces the cost of manufacturing and also results in improving the final product.

My invention resides in the use of sulphur dioxide and hydrogen sulphide for curing rubber during the precipitating process or after precipitation has been completed on fibers dispersed in a solution. Also, my invention resides in the method of vulcanizing pure rubber, after precipitation from a very dilute solution and while being in the form of very finely divided particles and held in suspension, by treatment with the above mentioned gases.

One method heretofore employed for vulcanizing rubber and rubber compounds having a filling material, such, for example, as sawdust, incorporated therein, consisted in heating the same under pressure. This method is objectionable because the heat frequently injures the filling material by charring, or otherwise damaging it. Furthermore, when dyes are used they are frequently decomposed or otherwise injured by the destructive action of sulphur at high temperatures.

Also, rubber alone has been cured without employing heat by several methods. One method is to form the raw rubber into sheets and pass the sheets alternately through two chambers containing sulphur dioxide and hydrogen sulphide, respectively. This process will hereinafter be referred to as the chamber process. Another method is to divide a cement composed of about 10% rubber into two parts and to mix sulphur dioxide with one of the parts and hydrogen sulphide with the other, subsequently mixing the two parts to effect vulcanization of the rubber. This process will be hereinafter referred to as the cement process. Both the chamber process and the cement process apparently effect vulcanization, but both are comparatively expensive.

By my invention I have provided a method of manufacturing rubberized composition in which heat is not employed, and in which a very intimate contact is obtained between the particles of rubber being precipitated and the fibers dispersed in the solution, the rubber being treated with the vulcanizing gases after being precipitated on the fibers, but while still remaining in suspension in the solution. Similarly, when applied to the vulcanization of rubber alone without the employment of heat, the process of manufacturing is materially simplified by eliminating a portion of the manufacturing process, and the rubber is more uniformly cured by reason of the intimate contact between the precipitated particles of rubber and the vulcanizing gases.

In practicing my invention, particularly as applied to the manufacture of rubberized composition, I dissolve a quantity of rubber in a liquid composed of approximately 77% of a rubber solvent, such, for example as toluol, benzol, gasoline, or the like, and about 23% of a rubber precipitating agent, such, for example, as alcohol, acetone, or the like. At the present time I prefer to utilize toluol and alcohol. It is highly important that the percentage of rubber in the solution be very small, for example, between ½ and 2% by weight of the total solution. The advantages of this highly diluted solution will be discussed further. After the rubber has been dissolved into the liquid, a small quantity of fibers, about equal in weight to the rubber, is mixed with the solution. These fibers may be of wood pulp, hemp jute, cotton, wool, asbestos or the like. It is necessary that these fibers be very thoroughly treated and separated, as, for example, by being beaten in a beater of the Holland type, such as used in the manufacture of paper. The fibers are so agitated in the solution as to be very thoroughly dispersed therein.

After the addition of the fibers, the rubber is precipitated thereon, either by the addition of a precipitating agent or by reducing the temperature of the solution, as described in my co-pending application, Serial Number 578,786, filed July 31, 1922. With the rubber coated fibers in suspension, the liquid is treated first with sulphur dioxide and subsequently with hydrogen sulphide. In this manner the rubber is treated with the vulcanizing gases while suspended in the solution. Since the coating of rubber formed on the fibers is very thin, a very intimate contact between the rubber particles and the vulcanizing gases is made. As a result a very thorough and uniform treatment is effected. The degree of vulcanization is determined by the quantity of the sulphur dioxide admitted to the solution, as an excess of hydrogen sulphide is always admitted, owing to the fact that the sulphur dioxide forms sulphurous acid with any moisture present unless it is all combined with the hydrogen sulphide. After treatment with the gases, the coated fibers are strained from the solution, preferably by screening so as to form a mat, and dried, thus forming a rubberized composition. The dilution of the mixture aids materially in the formation of the mat.

It is a fact that a 10% rubber solution, as heretofore employed in connection with this type of work, will jell, or form a thick, close-grained, sticky mass, upon being precipitated. I have found that if a very dilute solution of rubber, ½ to 2% be employed, the rubber is precipitated in the form of semi-colloidal particles which tend to remain dispersed in the liquid. In the formation of a fibrous material, this is a matter of very great importance, since the former method gives a homogeneous non-porous mass, whereas my method provides a porous material.

Another important step heretofore not used is the method of so straining the fibers from the liquid as to form a mat. When the filling material is mixed with a thick sticky mass, as heretofore described, and calendered, as is the present practice, the particles of the filling material bear no definite relation to each other and the fibers in materials made by those methods serve to increase the resistance of the material to tearing, but do not appreciably increase its tensile strength. When, however, a very dilute solution is used, the relatively large amount of water and the relatively great freedom of the particles therein permits and causes the fibers to arrange themselves in a felted or mat formation when the liquid is drained off. In this mat formation the rubber coated fibers are so intertwined and interlocked as to materially increase the tensile strength of the material, as well as the resistance to tearing. When the thick jelly-like mass of rubber is employed, that is, from the 10% solution, the fibers are held in place and cannot so distribute themselves as to form a felted formation because they are not free to move in the liquid, as are the fibers in the ½ to 2% solution.

As no heat is employed in manufacturing this composition, the fibers which constitute the filling material cannot be injured thereby, nor is any dye employed therein injured by the sulphur, since its destructive properties are very much lower at the ordinary temperatures than those formerly used in vulcanization. The resulting product is a considerable improvement on material produced with sawdust and the like as a filler. This is a result of the use of the finely divided interlocked fibers, each of which is provided with a coating of rubber, which results in a more flexible, tough and homogeneous material than has heretofore been possible to produce.

As applied to the vulcanization of rubber alone, the rubber is dissolved in a dilute solution of toluol and alcohol, as previously described. The rubber is then precipitated in a very finely divided state and, while in suspension, is treated with the sulphur dioxide and hydrogen sulphide. After the treatment, the particles of rubber are strained from the solution, formed into any desired shape, and dried.

The process of manufacturing herein described is superior to the chamber process in that it is not necessary to transfer the rubber from one chamber to another, which is particularly difficult and therefore objectionable by reason of the fact that both gases are contained in the chamber, which must necessarily be air tight. In practicing my invention, an ordinary tank containing the solution may be employed and the respective gases admitted by means of simple piping connection thereto. Also, it is believed that when sheets of rubber composition of any considerable thickness are passed through the chambers in question, the outside portion of the rubber must be over cured before the central portion thereof can be thoroughly cured, it is believed that, consequently, by practicing my invention, a product superior to that produced by the chamber process may be secured by a method of manufacture which is cheaper than the chamber process.

My present invention permits of all treatment of the liquid being made in a single tank, which may be open at the top if desired, thus providing a simpler and less expensive method of manufacture than the cement process.

A modification of my invention consists in treating the rubber in solution with sulphur dioxide, precipitating the rubber into a semi-colloidal condition, and treating the particles of rubber while in suspension with hydrogen sulphide to effect vulcanization thereof. The rubber is then strained from the liquid, given any desired form, and dried.

Another modification of my invention consists in adding to a rubber solution a quantity of fibers, treating the solution with sulphur dioxide, precipitating the rubber upon the fibers, straining the rubber coated fibers from the liquid so as to form them into a mat, then vulcanizing the rubber by treating the mat with hydrogen sulphide.

Still another form which my invention may assume consists in dispersing a quantity of separated fibers in a rubber solution, treating the solution with sulphur dioxide, precipitating the rubber upon the fibers, straining the rubber coated fibers from the liquid so as to form a mat therefrom, then subsequently washing the mat with alcohol containing a quantity of hydrogen sulphide. Similarly the mat may be treated with hydrogen sulphide after it has been both washed and dried.

While I have described several forms which my invention may assume, it will be obvious to those skilled in the art that it is not so limited but that various minor modifications and changes may be made therein without departing from the spirit of the invention or from the scope of the appended claims.

What I claim is:

1. The method of making a fibrous material which comprises mixing a relatively small quantity of fibers in a rubber solvent, dissolving a relatively small quantity of rubber in said solvent, precipitating the rubber on the fibers, introducing sulphur dioxide and hydrogen sulphide to said liquid, so straining said fibers from the liquid as to effect a matted formation, and drying the mat.

2. The method of making a fibrous material which comprises dispersing a quantity of fibers in a rubber solution, precipitating said rubber on said fibers and subsequently introducing vulcanizing agents thereto in gaseous form, so straining said fibers from the liquid as to form them into a mat, and drying the mat.

3. The method of making a fibrous material which comprises dispersing a quantity of fibers in a rubber solution, precipitating the rubber on the fibers and subsequently introducing sulphur dioxide and hydrogen sulphide to said fibers, straining, drying and forming said fibers into a mat formation.

4. The method of making a fibrous material which comprises dissolving in a liquid containing rubber solvent a quantity of rubber constituting from ½% to 2% of the weight of the liquid, adding a quantity of fibers thereto, precipitating the rubber on the fibers and treating them while in suspension with sulphur dioxide and hydrogen sulphide, and so straining said fibers from the liquid as to form a matted material, and drying said material.

5. The method of making a fibrous material which comprises dissolving in a liquid containing rubber solvent a quantity of rubber and a quantity of fibers each constituting approximately ½ to 2% of the weight of the liquid, precipitating the rubber on the fibers and treating them while in suspension with sulphur dioxide and hydrogen sulphide and so straining said fibers from the liquid as to form a matted material, and drying said material.

6. The method of vulcanizing which consists in treating rubber in a semi-colloidal state with vulcanizing agents in gaseous form.

7. The method of vulcanizing which consists in precipitating rubber from a solution, treating said precipitated rubber while in suspension with vulcanizing agents in gaseous form.

8. The method of vulcanizing which consists in precipitating rubber from a solution and introducing hydrogen sulphide and sulphur dioxide to said precipitated rubber.

9. The method of vulcanizing which consists in treating uncured rubber while suspended in a liquid in a flocculent state with sulphur dioxide and hydrogen sulphide.

10. The method of vulcanizing which consists in precipitating rubber from a solution, treating said precipitated rubber while in suspension with vulcanizing agents in gaseous form.

11. The method of vulcanizing which consists in precipitating rubber from a solution and introducing hydrogen sulphide and sulphur dioxide to said precipitated rubber.

12. A method of treating a suspended fiber rubber mixture which consists in causing the rubber material to react with sulphur dioxide and hydrogen sulfide, said rubber constituting approximately ½ to 2 percent of the weight of the suspending medium.

13. The method of vulcanizing which consists in treating uncured rubber while suspended in a liquid in a flocculent state with sulphur dioxide and hydrogen sulphide.

14. The method of vulcanization which consists in precipitating rubber from a solution of less than 4% rubber, and treating said rubber with sulphur dioxide and hydrogen sulphide while suspended in the liquid.

15. The method of making a fibrous material which consists in mixing a small quantity of fibers in a rubber solvent, dissolving less than 4% of rubber in said solvent, precipitating the rubber on the fibers, treating the rubber coated fibers while in suspension in the liquid with sulphur dioxide and hydrogen sulphide, so straining the fibers from the liquid as to form a mat, and drying said mat.

In witness whereof, I have hereunto signed my name.

JAMES M. GILLET.